United States Patent
Jamison et al.

(10) Patent No.: US 11,499,086 B1
(45) Date of Patent: Nov. 15, 2022

(54) SUBTERRANEAN DRILLING AND COMPLETION IN GEOTHERMAL WELLS

(71) Applicant: Halliburton Energy Services, Inc., Houston, TX (US)

(72) Inventors: Dale E. Jamison, Houston, TX (US); Brian Alan Evans, Houston, TX (US); William Walter Shumway, Houston, TX (US); Denise Nicole Benoit, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 17/556,836

(22) Filed: Dec. 20, 2021

(51) Int. Cl.
  *C09K 8/504* (2006.01)
  *E21B 33/138* (2006.01)

(52) U.S. Cl.
  CPC .......... *C09K 8/5045* (2013.01); *E21B 33/138* (2013.01)

(58) Field of Classification Search
  None
  See application file for complete search history.

(56) References Cited

U.S. PATENT DOCUMENTS

| | | | | |
|---|---|---|---|---|
| 4,120,369 A | * | 10/1978 | Fischer | E21B 21/003 166/292 |
| 4,525,285 A | * | 6/1985 | Son | C09K 8/32 507/131 |
| 2013/0126159 A1 | * | 5/2013 | Bryan | E21B 33/14 166/279 |
| 2017/0015887 A1 | * | 1/2017 | De Stefano | C09K 8/512 |
| 2020/0011151 A1 | | 1/2020 | Toews et al. | |
| 2020/0032126 A1 | * | 1/2020 | Ye | E21B 21/003 |

FOREIGN PATENT DOCUMENTS

CN 102660241 9/2012

* cited by examiner

*Primary Examiner* — Andrew Sue-Ako
(74) *Attorney, Agent, or Firm* — Tenley Krueger; C. Tumey Law Group PLLC

(57) ABSTRACT

A method for strengthening a subterranean formation is disclosed herein. A method of strengthening a subterranean formation includes: introducing a first fluid into the subterranean formation, wherein the first fluid includes polyvalent cations; and introducing a second fluid into the subterranean formation, wherein the second fluid includes a dissolved silicate in an aqueous-base fluid; wherein the dissolved silicate reacts with the polyvalent cations in the subterranean formation to form a reaction product including precipitated silicate in the subterranean formation.

17 Claims, 4 Drawing Sheets

SUBTERRANEAN DRILLING AND COMPLETION IN GEOTHERMAL WELLS

BACKGROUND

A natural resource such as oil or gas residing in a subterranean formation can be recovered by drilling a wellbore into the forination Wellbores can also be drilled to access natural geothermal energy found beneath the Earth's crust. In order to ensure that fracturing of low mechanical strength formations penetrated by a wellbore and other similar problems do not occur, it has heretofore been the practice to intermittently seal the wellbore by cementing pipe referred to in the art as casing or liners in the wellbore. The points in the wellbore during its drilling at which the drilling is stopped and casing or liners are installed in the wellbore are commonly referred to as "casing points." Casing or a liner may be placed in the wellbore above each casing point and a sealing composition, such as a hydraulic cement composition may be pumped into the annular space between the walls of the wellbore and the exterior surface of the casing or liner disposed therein. The hydraulic cement composition may be permitted to set in the annulus, thereby forming an annular sheath of hardened, substantially impermeable cement therein. The cement sheath may physically support and position the pipe in the wellbore and bond the pipe to the walls of the wellbore, whereby the undesirable migration of fluids between zones or formations penetrated by the wellbore may be prevented. This technique of cementing pipe in the wellbore as the drilling progresses has a number of disadvantages, including the time and expense incurred in placing and sealing the pipe, as well as the reduction in the well diameter after each casing point. That is, the well diameter may be reduced below each casing point so that a smaller casing may be lowered through the previously placed casing and sealed in the wellbore. Another problem that occurs in the drilling and completion of wellbores is that when the wellbore is drilled into and through weak zones or formations formed of clays, shales, sandstone and the like, clay, shale and sand may slough off the sides of the wellbore, which may enlarge the wellbore and may cause the drill bit and drill pipe to become stuck, whereby drilling must be stopped and remedial steps taken.

Traditional methods of overcoming the problems described above include sealing the zones through which the fluids can enter the subterranean formation with thixotropic cements, non-aqueous dispersions of clays, sodium silicate solutions in combination with calcium salt sweeps, and fluids containing inert platelets such as mica. However, the presence of such sealants in the formation may block the flow of oil or gas into the wellbore when it is desirable to begin production. Further, those materials may contaminate fresh water produced by the formation ahead of the oil or gas. Unfortunately, the sealants typically cannot be easily removed from the formation before production.

Silicate-base drilling fluids have been proposed for drilling of subterranean well, such as geothermal wells, wherein it is believed that the silica materials could strength the wellbore, eliminating the need for casing of further completion operations. While silicate-based drilling fluids have been used to drill wells in the past, they are now largely not used because they have a troublesome tendency to coat the drill pipe and other tools. Additionally, silicate-based drilling fluids often have high torque and drag that may not be easily managed by conventional lubricants. Finally, silicate-based drilling fluids are often run at high pH, in excess of 12, which may constitute an additional safety hazard that must be managed on the rig.

BRIEF DESCRIPTION OF THE DRAWINGS

These drawings illustrate certain aspects of some of the examples of the present disclosure and should not be used to limit or define the disclosure.

DETAILED DESCRIPTION

Figure 1:
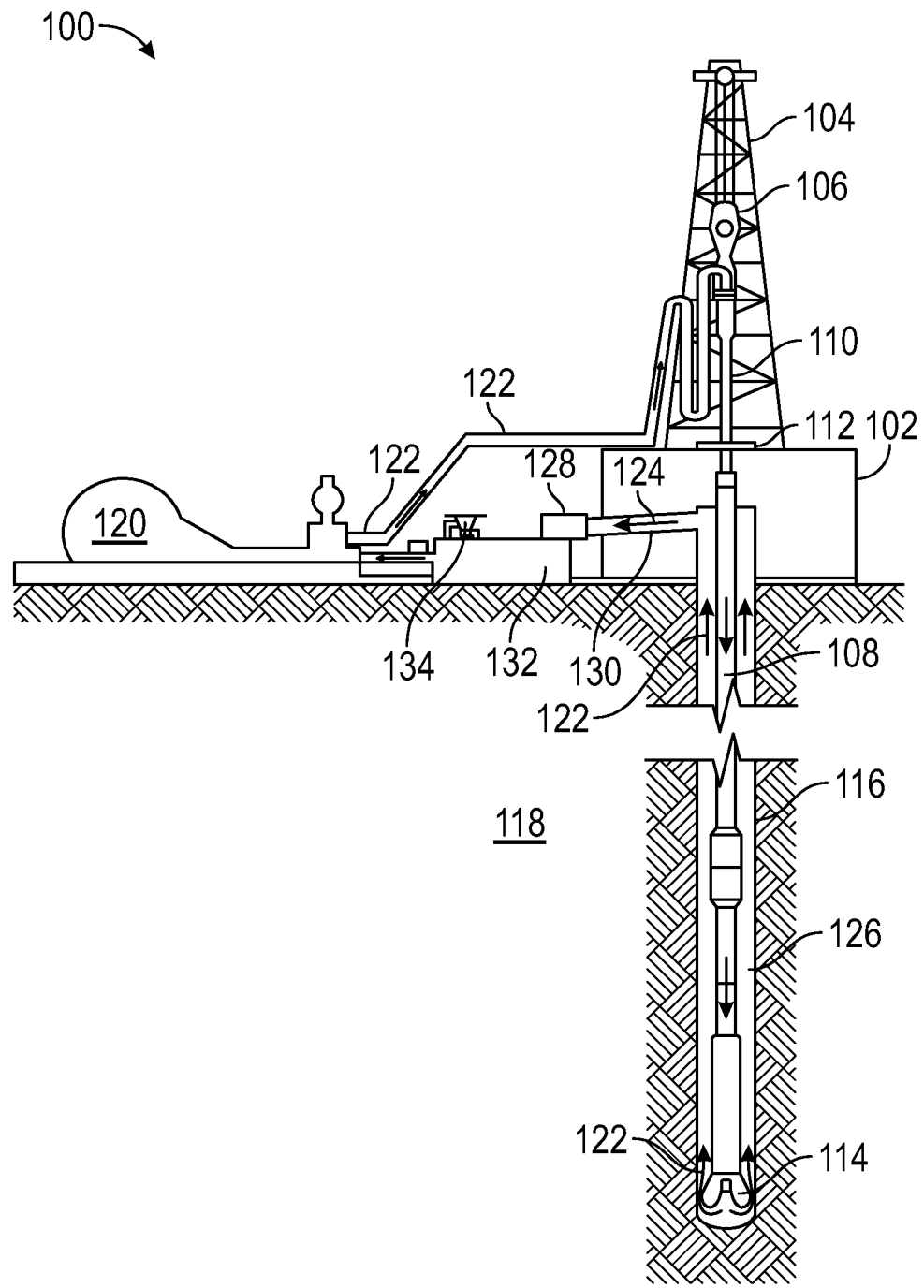
FIG. 1 is a schematic illustration of an example drilling system, in accordance with some embodiments of the present disclosure.

The present embodiments relate to subterranean operations, and, more particularly, in certain embodiments, to systems, methods, and compositions for well drilling and completion that can strengthen and isolate wellbores. These wellbores may penetrate subterranean formations that include weak zones or formations formed of clays, shales, sandstone, and the like, that would typically slough into the wellbore and produce sand if not cased. However, examples embodiments of the present techniques may strengthen and isolate wellbores by chemical treatments, thus minimizing or eliminating the need for casing or further completion operations. While the present techniques may be suitable for use in oil and gas wells, they be particularly suited for use in geothermal wells.

Example embodiments include drilling the wellbore using divalent saltwater fluids or other fluids that include a component that reacts with silicate materials. During drilling, the component may be deposited, for example, in the subterranean formation by fluid loss or particle invasion for subsequent reaction with silicate materials. The silicate material may then be squeezed into the subterranean formation to contact the previously placed material, such that they react causing silicate precipitation. By precipitating silicates in the subterranean formation, the wellbore can be strengthened and isolated.

Incorporating the methods, compositions and systems disclosed herein may provide a plurality of technical improvements. For example, examples embodiments can provide a method to drill through difficult sections of a formation by increasing the pressure window to help drill longer, lateral sections that may improve the heat load capacity of geothermal wells. The silicate-containing fluids lowing into the subterranean formation may be tailored by squeeze pressure and time at pressure. The treated formation may be pressure tested for isolation and the treatment may be repeated as needed. Lost circulation materials (LCMs) and fibers may be included in the silicate-containing fluid to increase strength by creating a composite silicate material. Moreover, by strengthening the wellbore according to methods disclosed herein, casing may be minimized or eliminated, resulting in a more cost-effective solution that may make marginal applications economically viable. Further, with a reduction of steel in the hottest part of the well, the need for corrosion inhibitors may be reduced, or the life of existing tubulars may be extended.

In some embodiments disclosed herein, a reactive first fluid including polyvalent cations and a base fluid may be introduced into the subterranean formation. In some embodiments, the reactive first fluid is a drilling fluid that is circulated through the wellbore during drilling. The first fluid may remove any residue that may block binding of silicate, that may be introduced into the wellbore later, to the surface of the subterranean formation. The first fluid may be used to drill any portion of the wellbore. For example, the first fluid may be used for drilling portions of the wellbore being chemically cased with silicate. In some embodiments, the first fluid may be used throughout the entire drilling process. During drilling, the first fluid may build on walls of the wellbore. Generally, filter cake may be permeable and susceptible to leak-off; hence, disrupting the filter cake may decrease the time required for the first fluid to migrate into cracks in the filter cake. For example, in some embodiments, the filter cake may be disrupted mechanically with scrapers or scratching devices prior to pumping the subsequent silicate-containing fluid. Alternatively, in some embodiments, the silicate-containing fluid may be jetted in a manner as to disrupt the filter cake. Generally, the first fluid may be used during drilling wherever casing may typically be required. The first fluid may be forced into the subterranean formation, such as into natural fractures, induced fractures, and pores of the subterranean formation. In some instances, the wellbore may be over-pressurized to create new fractures and provide wellbore strengthening using conventional LCMs that may include, but may not be limited to, glass fibers, calcium carbonate, magnesium carbonate, graphite, nut shells, diatomaceous earth, polymer, natural fibers, and combinations thereof. After the drilling of the wellbore is completed, a second fluid that including dissolved silicate may be introduced into the wellbore. The second fluid may further include a monovalent salt. In some embodiments, the second fluid may be free or essentially free of salts.

The second fluid may be placed across any formation zone that requires sealing. In some embodiments, the second fluid may be placed in particular zones or sections of the wellbore. In other embodiments, the second fluid may be placed in the entire wellbore. The second fluid may be introduced by spotting the fluid into the wellbore and performing a squeeze operation. As disclosed herein, a squeeze operation may be defined as pumping a fluid to a specific point in the wellbore with sufficient pressure to force the fluid into a desired location. Generally, a squeeze operation may be used to seal completion intervals, to repair casing leaks, to seal formation intervals, and to protect freshwater aquifers. The second fluid may react with the polyvalent cations from the first fluid that are in the subterranean formation, wherein the first fluid may have saturated the near wellbore pores, natural fractures, and induced fractures. The silicates in the spotting second fluid may precipitate in the subterranean formation. In the subterranean formation, for example, the silicates can seal the formation pores, natural fractures, and/or induced fractures; thereby strengthening the wellbore, resulting in effective isolation of the wellbore, and forming a durable and robust wellbore suitable for a plurality of subterranean operations.

The second fluid may include dissolved silicates, such as sodium silicate, a potassium silicate, a combination silicate, or combinations thereof. A reaction product including an insoluble precipitate may be formed when the dissolved silicates react with polyvalent cations, such as calcium cations. The insoluble precipitate may include the silicate and the polyvalent cation species. This precipitated silicate may form an impermeable plastering layer on the formation. Once formed, the impermeable plastering layer of the precipitated silicate may not permit the passage of fluids therethrough. In some embodiments, certain sections of the wellbore may remain openhole sections; however, sections having unstable formation whereupon the stabilization operations disclosed herein are performed will not remain openhole sections. The wellbore strengthening methods, compositions, and systems disclosed herein may be used, for example, to extend the drilling window, thereby strengthening the formation to support drilling further prior to installing a casing. In some instances, as disclosed herein, casing strings may be eliminated.

In some embodiments, fluid loss may not be minimized in order to ensure enough of the reactive first fluid has migrated into the formation for the purpose of maintaining an effective level of fluid leak-off. In some embodiments, the formation may require a higher level of fluid leak-off to facilitate placement of polyvalent cations deep into the formation. The methods, compositions, and systems disclosed herein may provide controlled leak-off, managing filter cake additives, and maintaining drilling fluid design parameters utilizing semi-permeable filter cakes.

In some embodiments, the well may be drilled with a conventional aqueous-based or oil-based fluid. In these embodiments, the first fluid may not need to be used. The second fluid may include, for example, dissolved silicates and a delayed-acid generator, such as a formic acid ester, lactic acid ester, acetic acid ester or an ortho-ester. The second fluid may be introduced into the wellbore such that portions of the second fluid are introduced into the subterranean formation. For example, the second fluid may either be allowed to leak-off into the pore space or into induced fractures, whereby it may be lost to the formation. After introduction, the delayed-acid generator produces acid in the subterranean formation with a corresponding pH may drop, thereby causing the silicate to precipitate and be deposited in the pore spaces of the formation.

In some embodiments, a third fluid may be introduced into well bore. The third fluid may be introduced after the second fluid to drive the precipitated silicate further into the formation before it sets. The third fluid may be utilized in order to avoid modifying the first or the second fluid during the initial completion of the well. In some embodiments, the third fluid may have an acidic pH so that the first and second fluids would remain basic while drilling and working over the drilled portion of the well. In further embodiments, the third fluid may be high or low salinity where the first and second fluids would be at different salinity for drilling and wellbore stability purposes. The third fluid may aid, for example, in prohibiting the precipitated silicate from precipitating on any drilling hardware, as this may lower the efficiency of a silicate treatment and potentially damage equipment used in the drilling and completion process.

The methods, compositions, and systems disclosed herein may be particularly suitable for use in geothermal wells or any type of well used for energy production, construction, or mining . . . for the purpose of stabilizing an otherwise unstable formation, while avoiding the time and cost of casing the entire wellbore with steel pipe. More specifically, embodiments disclosed herein may not require casing of freshwater zones with cemented steel pipe and completing the remaining wellbore as a plastered open-hole.

While the preceding discussion discloses drilling with the first fluid including polyvalent cations and then pushing the second fluid containing dissolves silicates into the formation, the technique may also be performed by first drilling with a drilling fluid containing dissolves silicates then pushing a fluid containing polyvalent cations into the formation. In a similar manner, the silicate in the formation from the drilling fluid would subsequently react with the polyvalent cations pushed into the formation wherein a reaction product is precipitated silicate, wherein the precipitated silicate seals at least a portion of the formation.

Example First Fluid

The first fluid may include polyvalent cations and a base fluid. The polyvalent cations should be reactive with silicates such that silicates precipitate out of solution when the polyvalent cations contact dissolved silicates in the subterranean formation. Examples of suitable polyvalent cations, include calcium cations, magnesium cations, aluminum cations, iron cations, manganese cations, chromium, copper cations, zinc cations, and combinations thereof. In some embodiments, the polyvalent cations may be present in an amount in excess of the silicates. However, in alternative embodiments, the polyvalent cations may be present in an amount less than the silicates.

The polyvalent cations may be provided by any suitable source. Examples of suitable polyvalent cation sources include dissolved polyvalent salts and dissolved soda ash. According to embodiments disclosed herein, polyvalent salts may include, but may not be limited to, calcium chloride, calcium bromide, calcium iodide, calcium nitrate, calcium sulfate, aluminum chloride, aluminum bromide, aluminum iodide, aluminum nitrate, aluminum sulfate, magnesium chloride, magnesium bromide, magnesium iodide, magnesium nitrate, magnesium sulfate, zinc chloride, zinc bromide, zinc iodide, zinc nitrate, zinc sulfate, iron chloride, iron bromide, iron iodide, iron nitrate, iron sulfate manganese chloride, manganese bromide, manganese iodide, manganese nitrate, manganese sulfate, chromium chloride, chromium bromide, chromium iodide, chromium nitrate, chromium sulfate copper chloride, copper bromide, copper iodide, copper nitrate, copper sulfate, and combinations thereof A suitable choice of polyvalent cations may depend on various factors, including, but not limited to, the density required to maintain overbalanced wellbore conditions; the presence or absence of hydrating clays; the desired final pH; formation damage; and concentration effects. the density required to maintain overbalanced wellbore conditions may be a primary concern. Brines including different salts may have various densities. For example, saturated calcium chloride brine has a density of about 11.2 lb/gal (1.3 kg/L); high density calcium bromide has a density of about 14.2 lb/gal (1.7 kg/L); combinations of calcium bromide and calcium nitrate may have densities above 15 lb/gal (1.8 kg/L); zinc bromide may have densities as high as 19.2 lb/gal (2.3 kg/L). Moreover, if a given wellbore requires a minimum of 141 b/gal (1.7 kg/L) fluid to maintain static well control, a high-density calcium bromide may be used instead of a lower density brine.

Calcium and aluminum may be particularly beneficial for reducing the swelling tendencies of hydrating clays. Zinc bromide fluids are naturally more acidic than calcium bromide, which is naturally more acidic than calcium chloride. The desired final pH of the first fluid may be influenced by salt choice. Regarding formation damage, some salts may be more damaging than others, depending on the make-up of the connate water within the pore spaces of the wellbore. For example, aluminum or copper may be used instead of calcium for the purpose of limiting formation damage. Further, if a low concentration of polyvalent cations is required for a given density, a higher weight salt may be selected over a lower weight salt. In contrast, if a high concentration cation is required, a highly soluble salt, such as calcium bromide, may be chosen over a lower solubility salt, such as calcium chloride.

Where used, polyvalent salts may be present in the first fluid in an amount in any suitable amount. For example, the polyvalent salts the range of about 1% to about 70% by volume of the total fluid composition. In some embodiments, the base fluid may be a brine saturated with the polyvalent salt. In some embodiments, the polyvalent salts may be present in the range of about 3% to about 70%, about 5% to about 70%, or about 10% to about 70% by volume of the total fluid composition.

The base fluid may be present in the first fluid in an any suitable amount. For example, the base fluid may be present in the range of about 30% to about 99.5% by total volume of the first fluid. Examples of suitable base fluids may include water, aqueous solutions, monovalent brines, alcohols, glycols, amines, or combinations thereof. Suitable base fluids may be aqueous-based, oil-based, or combinations thereof Thus, suitable base fluids for the first fluid may include, but are not limited to, oil-based fluids, aqueous-based fluids, aqueous-miscible fluids, water-in-oil emulsions, or oil-in-water emulsions.

Aqueous-base fluids suitable for use in the first fluid disclosed herein may include any of a variety of aqueous fluids suitable for use in subterranean applications. More specifically, the aqueous-base fluid may include fresh water, saltwater (e.g., water containing one or more salts dissolved therein), or seawater. Generally, the aqueous-base fluid may be from any source that does not contain an excess of compounds that may undesirably affect other components in the first fluid. The aqueous-base fluid typically may be present in the fluid compositions disclosed herein in an amount up to about 99.5% by volume of the fluid compositions. By way of example, the aqueous-base fluid may be present in the fluid compositions in an amount of about 50% to about 99% by volume. Alternatively, the aqueous-base fluid may be present in the fluid compositions in an amount of about 50% to about 99% by volume, about 60% to about 90%, or about 70% to about 80% by volume.

Optionally, oil-based fluids may be used. Suitable oil-based fluids may include alkanes, olefins, aromatic organic compounds, cyclic alkanes, paraffins, diesel fluids, mineral oils, desulfurized hydrogenated kerosene, heavy aromatic solvents, xylene, toluene, heavy aromatic naphtha, and any combination thereof The oil-based fluid typically may be present in the fluid compositions disclosed herein in an amount up to about 99.5% by volume of the treatment fluid. For example, the oil-based fluid may be present in the fluid compositions in an amount of about 50% to about 99% by volume. Alternatively, the oil-based fluid may be present in the fluid compositions in an amount of about 50% to about 99% by volume, about 60% to about 90%, or about 70% to about 80% by volume of the fluid compositions.

Suitable water-in-oil emulsions, also known as invert emulsions, may have an oil-to-water ratio from a lower limit of greater than about 50:50, 55:45, 60:40, 65:35, 70:30, 75:25, or 80:20 to an upper limit of less than about 100:0, 95:5, 90:10, 85:15, 80:20, 75:25, 70:30, or 65:35 by volume in the base fluid, where the amount may range from any lower limit to any upper limit and encompass any subset there between. It should be noted that for water-in-oil and oil-in-water emulsions, any mixture of the above may be used including the water being and/or including an aqueous-miscible fluid.

The first fluid may also include one or more additional additives suitable for use in subterranean operations. The additives may include, but may not be limited to, filtration control additive, surfactant, viscosifier, biocide, defoamer, scale inhibitor, pH stabilizer, bridging agent, shale stabilizer, corrosion inhibitor, thinner, suspension agent, oxygen scavenger, weighting material, lost circulation material, lubricant, emulsifier, wetting agent, anti-accretion additive, non-emulsifier, corrosion inhibitor, rate of penetration (ROP) enhancer, hydrogen sulfide scavenger, scale preventor, or combinations thereof.

Example Second Fluid

The second fluid may include dissolved silicate in an aqueous-base fluid. Silicates may include silica stabilized by an alkali. The alkali may include, for example, sodium, potassium or lithium oxide. Examples of suitable silicates may include potassium silicates, sodium silicates, and sodium aluminosilicates. The dissolved silicates may under gelation and precipitation reaction, which may be used to strength subterranean formations. For example, gelation reactions may occur from a drop in pH resulting in formation of soluble silicate structures. By way of further example, precipitation reactors can occur between the dissolved silicates and multivalent cations. The precipitation may occur from cross-linking of the silicate molecules by the multivalent cations.

The dissolved silicate may be present in the second fluid in any suitable amount. For example, the dissolved silicate may be present in an amount of about 40% or less by weight of the second fluid. In some embodiments, the dissolved silicate may be present in an amount of about 2% to about 40% by weight of the second fluid or about 5% to about 40% by weight of the second fluid.

The second fluid may include an aqueous-base fluid. Aqueous-base fluids suitable for use in the first fluid disclosed herein may include any of a variety of aqueous fluids suitable for use in subterranean applications. More specifically, the aqueous-base fluid may include fresh water, saltwater (e.g., water containing one or more salts dissolved therein), or seawater. Generally, the aqueous-base fluid may be from any source that does not contain an excess of compounds that may undesirably affect other components in the first fluid. For example, the aqueous-base fluid generally should not include polyvalent cations (e.g., polyvalent salts) that would undesirably react with the dissolved silicate to cause premature precipitation. In some embodiments, the second fluid includes a monovalent salt. In some embodiments, the second fluid may be free or essentially free of salt. For example, the second fluid may include free of salt or include salt in an amount of about 1% by weight or less.

The aqueous-base fluid typically may be present in the second fluid in any suitable amount, including an amount up to about 99.5% by volume of the second fluid. By way of example, the aqueous-base fluid may be present in the second fluid in an amount of about 50% to about 99% by volume. Alternatively, the aqueous-base fluid may be present in the second fluid in an amount of about 50% to about 99% by volume, about 60% to about 90%, or about 70% to about 80% by volume.

The second fluid may optionally include lost circulation materials. As previously described, the lost circulation materials may be included, for example, to create a composite material with the precipitated silicate by depositing the lost circulation materials in the formation with the precipitated silicate. Examples of suitable lost circulation materials include any of a variety of materials used for lost circulation control, including ground nutshells, asphaltenes, ground coal, cellulosic materials, plastic materials, sized marble, flaked calcium carbonate, fibers, graphite, foams, diatomaceous earth, and sized waste plastic laminates, among others. Where used, the lost circulation material may be included in the second fluid in any suitable amount. For example, the lost circulation material may be present in the second fluid in an amount of about 2 pounds to about 120 pounds per barrel (5.7 kg/m3 to 342 kg/m3 ) of the second fluid or from about 40 pounds to about 80 pounds per barrel (114 kg/m3 to 228 kg/m3 ) of the second fluid or from about 2 pounds to about 20 pounds per barrel (5.7 kg/m3 to 57 kg/m3) of the second fluid.

The second fluid may optionally include delayed-acid generator. In some embodiments, delayed-acid generators include compounds that hydrolyze to form acids. As previously described, the delayed-acid generator may be used to generate an acid in the second fluid after squeezing into the subterranean formation to thereby cause silicate precipitation. Examples of suitable delayed-acid generators include esters such as ortho esters; poly(ortho esters); aliphatic polyesters; lactides, poly (lactides); glycolides; poly (glycolides); lactones; poly(ε-caprolactones); poly(hydroxybutyrates); anhydrides; poly(anhydrides); and poly(amino acids). Specific examples of suitable delayed-acid generators include formic acid ester, lactic acid ester, acetic acid ester, and ortho esters. Where used, the delayed-acid generator may be included in the second fluid in any suitable amount. For example, the delayed-acid generator may be present in the second fluid in an amount of about 1% to about 35% by weight of the second fluid or about 5% to about 30% by weight of the second fluid or about 10% to about 28% by weight of the second fluid.

The second fluid may also include additional additives as desired for a particular application. Examples of suitable additives include nanoparticles, pH modifiers, permeability modifiers, bridging agents, lost circulation materials, filtration control agents, lubricants, wetting agents, shale stabilizers, and combinations thereof. Additional additives may also include, but may not be limited to, surfactants, gas, foaming agents, corrosion inhibitors, biocides, antifoam agents, dispersants, flocculants, $H_2S$ scavengers, $CO_2$ scavengers, oxygen scavengers, and any combination thereof. In some embodiments, the additional additives may include high thermal conductivity additives, such as graphite, aluminum, aluminum nitride, silicon carbide, tungsten solids/powers, and combinations thereof. One of ordinary skill in the art should be able to recognize and select suitable additives for use in the fluid compositions disclosed herein with the benefit of this disclosure.

Example Third Fluid

The third fluid may include an aqueous-base fluid. As previously described, the third fluid may be introduced into the wellbore to push the precipitated silicate further into the subterranean formation. Aqueous-base fluids suitable for use in the third fluid disclosed herein may include any of a variety of aqueous fluids suitable for use in subterranean applications. More specifically, the aqueous-base fluid may include fresh water, saltwater (e.g., water containing one or more salts dissolved therein), or seawater. Generally, the aqueous-base fluid may be from any source that does not contain an excess of compounds that may undesirably affect other components in the third fluid.

The third fluid may optionally include pH modifiers. The pH modifier may be included in the third fluid to provide a desired pH. For example, the pH modifier may be included to provide a pH of about 0.1 to about 3 in the third fluid. In some embodiments, the pH modifier may be included to provide a pH of about 1. The desired pH may depend on a number of factors, including reservoir lithology and conditions, such as temperature and pressure. Examples of suitable pH modifiers include acetic and formic acids. Additional pH modifiers may include esters, such as ortho esters; poly(ortho esters); aliphatic polyesters; lactides, poly(lactides); glycolides; poly(glycolides); lactones; poly(.epsilon.-caprolactones); poly(hydroxybutyrates); anhydrides; poly(anhydrides); and poly(amino acids). Where used, the pH modifier may be included in the third fluid in any suitable amount. For example, the delayed-acid generator may be present in the third fluid in an amount of about 1% to about 10% by weight of the second fluid.

The third fluid may also include one or more additional additives suitable for use in subterranean operations. The additives may include, but may not be limited to, filtration control additive, surfactant, viscosifier, biocide, defoamer, scale inhibitor, pH stabilizer, bridging agent, shale stabilizer, corrosion inhibitor, thinner, suspension agent, oxygen scavenger, weighting material, lost circulation material, lubricant, emulsifier, wetting agent, anti-accretion additive, non-emulsifier, corrosion inhibitor, ROP enhancer, hydrogen sulfide scavenger, scale preventor, or combinations thereof.

Example Embodiments

An example method or technique of using the methods, compositions, and systems disclosed herein in a subterranean formation will now be described in more detail with reference to FIG. 1. It should be noted that while FIG. 1 generally depicts a land-based drilling assembly, those skilled in the art will readily recognize that the principles described herein are equally applicable to subsea drilling operations that employ floating or sea-based platforms and rigs, without departing from the scope of the disclosure.

As illustrated, the drilling assembly 100 may include a drilling platform 102 that supports a derrick 104 having a traveling block 106 for raising and lowering a drill string 108. The drill string 108 may include, but is not limited to, drill pipe and coiled tubing, as generally known to those skilled in the art. A kelly 110 may support the drill string 108 as it is lowered through a rotary table 112. A drill bit 114 may be attached to the distal end of the drill string 108 and may be driven, either by a downhole motor and/or via rotation of the drill string 108, from the well surface. As the drill bit 114 rotates, it creates a wellbore 116 that penetrates various subterranean formations 118.

A pump 120 (e.g., a mud pump) circulates drilling fluid 122 through a feed pipe 124 to the kelly 110, which conveys the drilling fluid 122 downhole through the interior of the drill string 108 and through one or more orifices in the drill bit 114. As previously described, the first fluid may be used, for example, as the drilling fluid 122 for drilling at least a portion of the wellbore 116. The drilling fluid 122 may then be circulated back to the surface via an annulus 126, defined between the drill string 108 and the walls of the wellbore 116. At the surface, the recirculated or spent drilling fluid 122 exits the annulus 126 and may be conveyed to one or more fluid processing unit(s) 128 via an interconnecting flow line 130. After passing through the fluid processing unit(s) 128, a "cleaned" drilling fluid 122 is deposited into a nearby retention pit 132 (i.e., a mud pit). While illustrated as being arranged at the outlet of the wellbore 116 via the annulus 126, those skilled in the art will readily appreciate that the fluid processing unit(s) 128 may be arranged at any other location in the drilling assembly 100 to facilitate its proper function, without departing from the scope of the disclosure.

One or more of the disclosed fluids or other additives may be added to the drilling fluid 122 via a mixing hopper 134 communicably coupled to or otherwise in fluid communication with the retention pit 132. The mixing hopper 134 may include, but is not limited to, mixers and related mixing equipment known to those skilled in the art. In other embodiments, the disclosed fluids may be added to the drilling fluid 122 at any other location in the drilling assembly 100. In at least one embodiment, for example, there may be more than one retention pit 132, such as multiple retention pits 132 in series. Moreover, the retention pit 132 may be representative of one or more fluid storage facilities and/or units where the disclosed fluids may be stored, reconditioned, and/or regulated until added to the drilling fluid 122.

In some embodiments, a pump 136 circulates the fluid compositions 138 through a feed pipe 142 to the kelly 110, which conveys the fluid compositions 138 downhole through the interior of the drill string 108 and through one or more orifices in the drill bit 114, contacting, then a filter cake 140. The fluid compositions 138 may then be circulated back to the surface via an annulus 126, defined between the drill string 108 and the walls of the wellbore 116, wherein the fluid compositions 138 contact, saturate, and flow. As mentioned above, the disclosed the delayed fluid compositions 138 may directly or indirectly affect the components and equipment of the drilling assembly 100. For example, the disclosed the fluid compositions 138 may directly or indirectly affect the fluid processing unit(s) 128, which may include, but not limited to, one or more shakers (e.g., shale shaker), a centrifuge, a hydrocyclone, a separator (including magnetic and electrical separators), a desilter, a desander, a separator, a filter (e.g., diatomaceous earth filters), a heat exchanger, or any fluid reclamation equipment. The fluid processing unit(s) 128 may further include one or more sensors, gauges, pumps, compressors, and the like used to store, monitor, regulate, and/or recondition the exemplary fluids.

The disclosed fluids, including the fluid compositions 138 may also directly or indirectly affect the pump 120, which representatively includes any conduits, pipelines, trucks, tubulars, and/or pipes used to fluidically convey the fluids downhole, any pumps, compressors, or motors (e.g., topside or downhole) used to drive the fluids into motion, any valves or related joints used to regulate the pressure or flow rate of the fluids, and any sensors (i.e., pressure, temperature, flow rate, etc.), gauges, and/or combinations thereof, and the like. The disclosed fluids, including the fluid compositions 138, may also directly or indirectly affect the mixing hopper 134 and the retention pit 132 and their assorted variations.

The disclosed fluids may also directly or indirectly affect the various downhole equipment and tools that may come into contact with the fluids such as, but not limited to, the drill string 108, any floats, drill collars, mud motors, downhole motors and/or pumps associated with the drill string 108, and any MWD/LWD tools and related telemetry equipment, sensors or distributed sensors associated with the drill string 108. The disclosed fluids may also directly or indirectly affect any downhole heat exchangers, valves and corresponding actuation devices, tool seals, packers and other wellbore isolation devices or components, and the like associated with the wellbore 116. The disclosed fluids may also directly or indirectly affect the drill bit 114, which may include, but is not limited to, roller cone bits, PDC bits, natural diamond bits, any hole openers, reamers, coring bits, etc.

Figure 2:
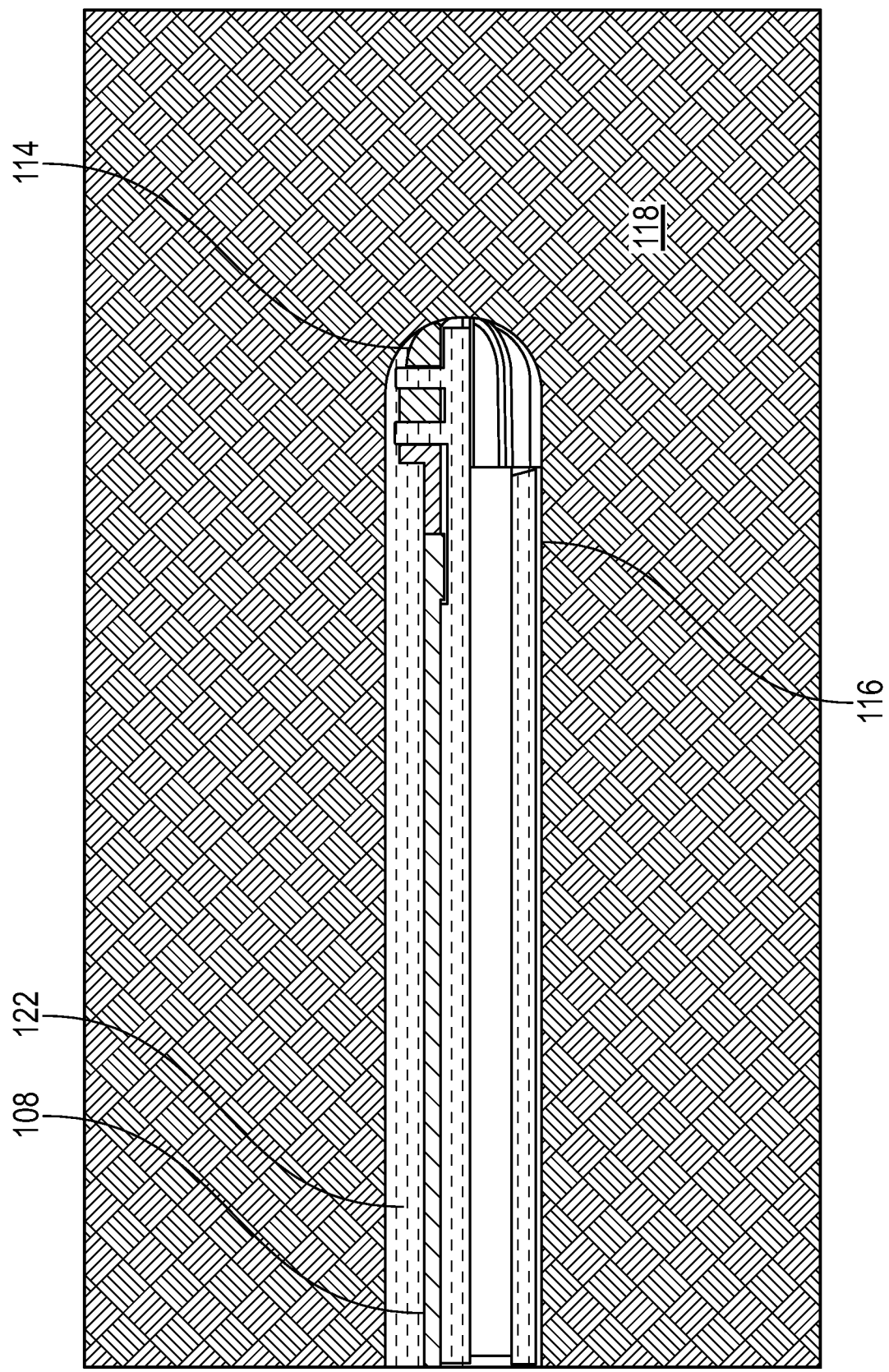
FIG. 2 is a schematic illustration of a close-up on a bottom-hole drilling operation, in accordance with some embodiments of the present disclosure.
Figure 3:
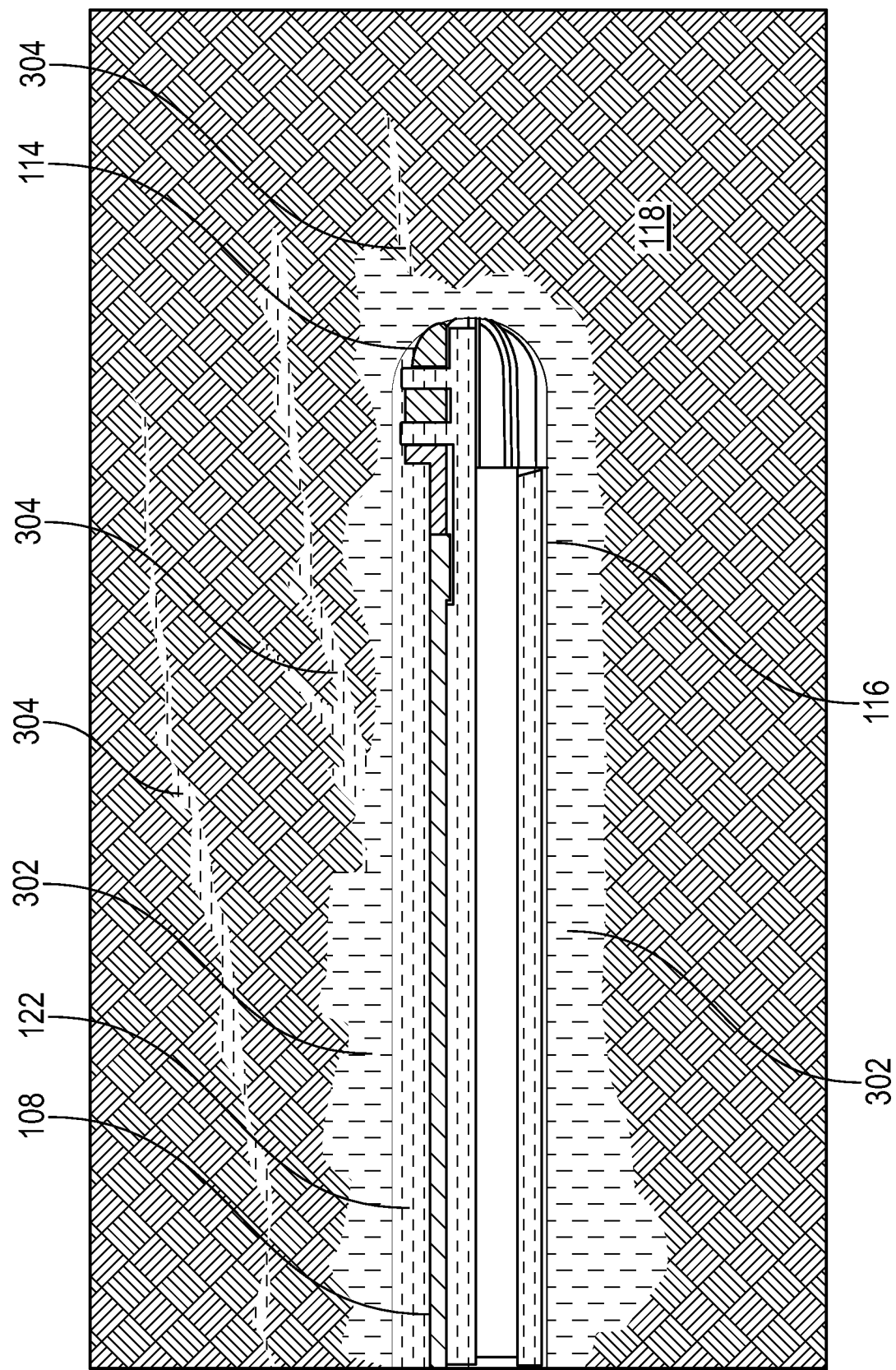
FIG. 3 is a schematic illustration of a close-up on a bottom-hole drilling operation, including a first fluid in pore spaces and fractures, in accordance with some embodiments of the present disclosure.
Figure 4:
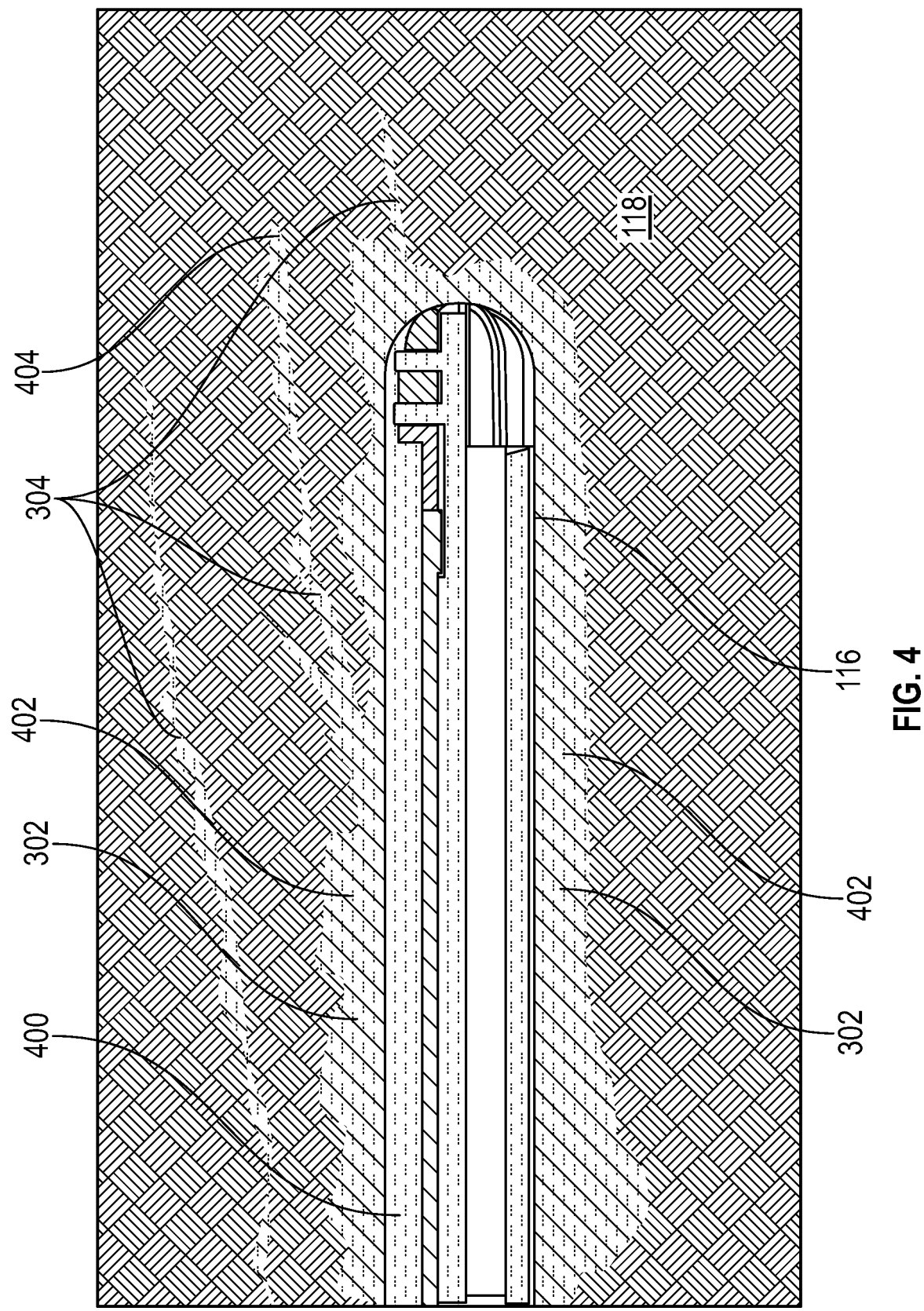
FIG. 4 is a schematic illustration of a close-up on a bottom hole drilling operation, including a reaction product in pore spaces and fractures, in accordance with some embodiments of the present disclosure.

FIGS. 2-4 are schematic illustrations of a close-up on a bottom-hole drilling operation, in accordance with some embodiments of the present disclosure. As illustrated, the drill string 108 with a drill bit 114 disposed thereon are positioned in the wellbore 116. The wellbore 116 penetrates the subterranean formation 118. With specific reference to FIG. 2, the wellbore is being drilled with a drilling fluid 122 including a first fluid, as described herein. The first fluid may include polyvalent cations. In accordance with some embodiments, at least a portion of the first fluid may leak off or otherwise be introduced into the subterranean formation 118. As illustrated in FIG. 3, pore spaces surrounding the wellbore 116 may contain filtrate of the first fluid forming an invaded zone 302. As further illustrated, fractures 304 in the subterranean formation 118 may also contain the first fluid. The fractures 304 may be natural or induced fractures. Moving to FIG. 4, the second fluid 400, as described herein, 400, may be introduced into the wellbore 116, in accordance with some embodiments of the present disclosure. The second fluid may include a dissolved silicate. As previously described, at least a portion of the second fluid 400 may be squeezed into the subterranean formation 118 such that the dissolved silicate in the second fluid 400 reacts with the polyvalent cations from the first fluid to form precipitated silicate 402, 404 in pore spaces of the invaded zone 302 and the fractures 304.

Accordingly, systems, methods, and compositions are provided for well drilling and completion that can strengthen and isolate wellbores.

The systems, methods, and compositions may include any of the various features disclosed herein, including one or more of the following statements.

Statement 1. A method of strengthening a subterranean formation comprising: introducing a first fluid into the subterranean formation, wherein the first fluid comprises polyvalent cations; and introducing a second fluid into the subterranean formation, wherein the second fluid comprises a dissolved silicate in an aqueous-base fluid; wherein the dissolved silicate reacts with the polyvalent cations in the subterranean formation to form a reaction product comprising precipitated silicate in the subterranean formation.

Statement 2. The method of Statement 1, wherein the precipitated silicate forms a seal in the subterranean formation that strengths the subterranean formation.

Statement 3. The method of Statement 1 or Statement 2, wherein the first fluid is a drilling fluid, and wherein the method further comprises drilling a wellbore in the subterranean formation with the first fluid such that at least a portion of the first fluid leaks off into the subterranean formation.

Statement 4. The method of any preceding Statement, wherein the introducing the second fluid comprises squeezing the second fluid into subterranean formation after the first fluid is introduced into the subterranean formation while drilling.

Statement 5. The method of Statement 1 or Statement 2, wherein the second fluid is a drilling fluid, and wherein the method further comprises drilling a wellbore in the subterranean formation with the second fluid such that at least a portion of the second fluid leaks off into the subterranean formation.

Statement 6. The method of any preceding Statement, further comprising introducing a third fluid into the subterranean formation to push the precipitated silicate further into the subterranean formation.

Statement 7. The method of any preceding Statement, wherein the introducing the first fluid comprises squeezing the subterranean formation after second fluid is introduced into the subterranean formation while drilling.

Statement 8. The method of any preceding Statement, wherein a source of the polyvalent cations in the first fluid comprises soda ash.

Statement 9. The method of any preceding Statement, wherein a source of the polyvalent cations in the first fluid comprises a polyvalent salt.

Statement 10. The method of Statement 9, wherein the polyvalent salt comprises at least one salt selected from the group consisting of calcium chloride, calcium bromide, calcium iodide, calcium nitrate, calcium sulfate, aluminum chloride, aluminum bromide, aluminum iodide, aluminum nitrate, aluminum sulfate, magnesium chloride, magnesium bromide, magnesium iodide, magnesium nitrate, magnesium sulfate, zinc chloride, zinc bromide, zinc iodide, zinc nitrate, zinc sulfate, iron chloride, iron bromide, iron iodide, iron nitrate, iron sulfate manganese chloride, manganese bromide, manganese iodide, manganese nitrate, manganese sulfate, chromium chloride, chromium bromide, chromium iodide, chromium nitrate, chromium sulfate copper chloride, copper bromide, copper iodide, copper nitrate, copper sulfate, and combinations thereof.

Statement 11. The method of any preceding Statement, wherein the second fluid comprises a lost circulation material, such that a composite is formed in the subterranean formation comprising the lost circulation material and the precipitated silicate.

Statement 12. The method of any preceding Statement, wherein the precipitated silicate comprises at least element selected from the group consisting of calcium, magnesium, zinc, aluminum, iron, copper, manganese, chromium, and combinations thereof Statement 13. The method of any one of Statements 1, 2, or 5 to 12, wherein the first fluid is spotted in a wellbore across the subterranean formation such that at least a portion of the first fluid leaks off into the subterranean formation.

Statement 14. The method of any preceding Statement, wherein the first fluid is introduced into pore spaces surrounding a wellbore penetrating the subterranean formation and one or more fractures in the subterranean formation.

Statement 15. The method of any preceding Statement, wherein the precipitated silicate forms an impermeable plastering layer on the subterranean formation.

Statement 16. A method for strengthening a subterranean formation comprising: drilling a wellbore into the subterranean formation with a drilling fluid comprises polyvalent cations and a base fluid, wherein at least a portion of the drilling fluid leaks off into pore spaces in the subterranean formation surrounding the wellbore and one or more fractures in the subterranean formation; introducing a second fluid into the wellbore, wherein the second fluid comprises a dissolved silicate, a monovalent salt, and an aqueous-base fluid; and squeezing at least portion of the second fluid from the wellbore into the subterranean formation; wherein the dissolved silicate in the portion of the second fluid squeezed into the subterranean formation reacts with the polyvalent cations in the subterranean formation to form a reaction product comprising precipitated silicate; wherein the precipitated silicate forms an impermeable plastering layer on the subterranean formation.

Statement 17. The method of Statement 16, wherein a source of the polyvalent cations in the drilling fluid comprises calcium chloride.

Statement 18. The method of Statement 16 or Statement 17, wherein the dissolved silicate comprises at least one silicate selected from the group consisting of a dissolved potassium silicate, a dissolved sodium silicate, a dissolved aluminosilicate, and combinations thereof Statement 19. A method of strengthening a subterranean formation comprising: introducing a fluid into a subterranean formation, wherein the fluid comprises a dissolved silicate, a delayed-acid generator, and an aqueous-based fluid; wherein the delayed-acid generator releases an acid in the subterranean formation causing a pH of the fluid to reduce such that silicate precipitates in pore spaces and/or fracture in the subterranean formation.

Statement 20. The method of Statement 19, wherein the delayed-acid generator hydrolyzes to release the acid.

For the sake of brevity, only certain ranges are explicitly disclosed herein. However, ranges from any lower limit may be combined with any upper limit to recite a range not explicitly recited, as well as, ranges from any lower limit may be combined with any other lower limit to recite a range not explicitly recited, in the same way, ranges from any upper limit may be combined with any other upper limit to recite a range not explicitly recited. Additionally, whenever a numerical range with a lower limit and an upper limit is disclosed, any number and any included range falling within the range are specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values even if not explicitly recited. Thus, every point or individual value may serve as its own lower or upper limit combined with any other point or individual value or any other lower or upper limit, to recite a range not explicitly recited.

Therefore, the present disclosure is well adapted to attain the ends and advantages mentioned as well as those that are inherent therein. The examples disclosed above are illustrative only, as the present embodiments may be modified and practiced in different but equivalent manners apparent to those skilled in the art having the benefit of the teachings herein. Although individual examples are discussed, the present disclosure covers all combinations of all those examples. Furthermore, no limitations are intended to the details of construction or design herein shown, other than as described in the claims below. Also, the terms in the claims have their plain, ordinary meaning unless otherwise explicitly and clearly defined by the patentee. It is therefore evident that the illustrative examples disclosed above may be altered or modified and all such variations are considered within the scope and spirit of the present disclosure. If there is any conflict in the usages of a word or term in this specification and one or more patent(s) or other documents that may be incorporated herein by reference, the definitions that are consistent with this specification should be adopted.

What is claimed is:

1. A method of strengthening a subterranean formation in a geothermal well, comprising:
   introducing a first fluid into the subterranean formation, wherein the first fluid comprises polyvalent cations, wherein the first fluid is a drilling fluid, and wherein the method further comprises drilling a wellbore in the subterranean formation with the first fluid such that at least a portion of the first fluid leaks off into the subterranean formation; and
   introducing a second fluid into the subterranean formation, wherein the second fluid comprises a dissolved silicate in an aqueous-base fluid;
   wherein the dissolved silicate reacts with the polyvalent cations in the subterranean formation to form a reaction product comprising precipitated silicate in the subterranean formation in the geothermal well.

2. The method of claim 1, wherein the precipitated silicate forms a seal in the subterranean formation that strengthens the subterranean formation.

3. The method of claim 1, further comprising introducing a third fluid into the subterranean formation to push the precipitated silicate further into the subterranean formation.

4. The method of claim 1, wherein the first fluid comprises soda ash.

5. The method of claim 1, wherein a source of the polyvalent cations in the first fluid comprises a polyvalent salt.

6. The method of claim 5, wherein the polyvalent salt comprises at least one salt selected from the group consisting of calcium chloride, calcium bromide, calcium iodide, calcium nitrate, calcium sulfate, aluminum chloride, aluminum bromide, aluminum iodide, aluminum nitrate, aluminum sulfate, magnesium chloride, magnesium bromide, magnesium iodide, magnesium nitrate, magnesium sulfate, zinc chloride, zinc bromide, zinc iodide, zinc nitrate, zinc sulfate, iron chloride, iron bromide, iron iodide, iron nitrate, iron sulfate manganese chloride, manganese bromide, manganese iodide, manganese nitrate, manganese sulfate, chromium chloride, chromium bromide, chromium iodide, chromium nitrate, chromium sulfate copper chloride, copper bromide, copper iodide, copper nitrate, copper sulfate, and combinations thereof.

7. The method of claim 1, wherein the second fluid comprises a lost circulation material, such that a composite is formed in the subterranean formation comprising the lost circulation material and the precipitated silicate.

8. The method of claim 1, wherein the precipitated silicate comprises at least element selected from the group consisting of calcium, magnesium, zinc, aluminum, iron, copper, manganese, chromium, and combinations thereof.

9. The method of claim 1, wherein the first fluid is spotted in a wellbore across the subterranean formation such that at least a portion of the first fluid leaks off into the subterranean formation.

10. The method of claim 1, wherein the first fluid is introduced into pore spaces surrounding a wellbore penetrating the subterranean formation and one or more fractures in the subterranean formation.

11. The method of claim 1, wherein the precipitated silicate forms an impermeable plastering layer on the subterranean formation.

12. A method of strengthening a subterranean formation in a geothermal well, comprising:
   introducing a first fluid into the subterranean formation, wherein the first fluid comprises polyvalent cations; and
   introducing a second fluid into the subterranean formation, wherein the second fluid comprises a dissolved silicate in an aqueous-base fluid, wherein the introducing the second fluid comprises squeezing the second fluid into subterranean formation after the first fluid is introduced into the subterranean formation while drilling;

wherein the dissolved silicate reacts with the polyvalent cations in the subterranean formation to form a reaction product comprising precipitated silicate in the subterranean formation in the geothermal well.

13. A method for strengthening a subterranean formation in a geothermal well, comprising:

drilling a wellbore into the subterranean formation with a drilling fluid comprises polyvalent cations and a base fluid, wherein at least a portion of the drilling fluid leaks off into pore spaces in the subterranean formation surrounding the wellbore and one or more fractures in the subterranean formation;

introducing a second fluid into the wellbore, wherein the second fluid comprises a dissolved silicate, a monovalent salt, and an aqueous-base fluid; and squeezing at least portion of the second fluid from the wellbore into the subterranean formation;

wherein the dissolved silicate in the portion of the second fluid squeezed into the subterranean formation reacts with the polyvalent cations in the subterranean formation to form a reaction product comprising precipitated silicate;

wherein the precipitated silicate forms an impermeable plastering layer on the subterranean formation in an openhole section of the geothermal well.

14. The method of claim 13, wherein a source of the polyvalent cations in the drilling fluid comprises calcium chloride.

15. The method of claim 13, wherein the dissolved silicate comprises at least one silicate selected from the group consisting of a dissolved potassium silicate, a dissolved sodium silicate, a dissolved aluminosilicate, and combinations thereof.

16. The method of claim 13, wherein the precipitated silicate comprises at least element selected from the group consisting of calcium, magnesium, zinc, aluminum, iron, copper, manganese, chromium, and combinations thereof.

17. The method of claim 13, wherein the second fluid comprises a lost circulation material, such that a composite is formed in the subterranean formation comprising the lost circulation material and the precipitated silicate.

* * * * *